(12) United States Patent
Sato et al.

(10) Patent No.: US 8,550,495 B2
(45) Date of Patent: Oct. 8, 2013

(54) AIRBAG APPARATUS

(71) Applicant: Toyoda Gosei Co., Ltd., Kiyosu (JP)

(72) Inventors: Eiji Sato, Kiyosu (JP); Norihisa Taya, Kiyosu (JP); Norio Mizuno, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 13/675,030

(22) Filed: Nov. 13, 2012

(65) Prior Publication Data

US 2013/0119649 A1 May 16, 2013

(30) Foreign Application Priority Data

Nov. 15, 2011 (JP) .................................. 2011-249988
Oct. 25, 2012 (JP) .................................. 2012-235770

(51) Int. Cl.
 *B60R 21/233* (2006.01)
(52) U.S. Cl.
 USPC ....................................... 280/730.2; 280/739
(58) Field of Classification Search
 USPC .................................. 280/730.2, 739, 743.1
 IPC ........................................ B60R 21/233, 21/239
 See application file for complete search history.

(56) References Cited

U.S. PATENT DOCUMENTS

| 7,431,332 B2 | 10/2008 | Wipasuramonton et al. |
| 7,503,582 B2 | 3/2009 | Sendelbach et al. |
| 7,862,077 B2 | 1/2011 | Yokota |
| 7,900,957 B2 | 3/2011 | Honda |
| 8,181,989 B2 | 5/2012 | Okuhara |
| 2008/0296875 A1 * | 12/2008 | Aho et al. ..................... 280/729 |
| 2009/0020987 A1 * | 1/2009 | Wipasuramonton et al. . 280/729 |
| 2010/0133796 A1 | 6/2010 | Mizuno |

FOREIGN PATENT DOCUMENTS

| DE | 102008030188 A1 * | 1/2009 | ............ B60R 21/233 |
| JP | 09-272388 A | 10/1997 | |
| JP | 2005-531451 A | 10/2005 | |
| JP | 2007-246047 A | 9/2007 | |
| JP | 2007-530364 A | 11/2007 | |
| JP | 2009-040231 A | 2/2009 | |
| JP | 2009-154832 A | 7/2009 | |
| JP | 2009-227020 A | 10/2009 | |
| JP | 2009-274516 A | 11/2009 | |
| JP | 2010-116133 A | 5/2010 | |
| JP | 2010-116134 A | 5/2010 | |
| JP | 2010-126017 A | 6/2010 | |
| JP | 2010-280325 A | 12/2010 | |
| WO | 03/101788 A1 | 12/2003 | |
| WO | 2005/097555 A1 | 10/2005 | |

* cited by examiner

*Primary Examiner* — Faye M. Fleming
(74) *Attorney, Agent, or Firm* — Posz Law Group, PLC

(57) ABSTRACT

An airbag apparatus having an airbag, which is formed into a bag shape by sewing a base fabric, is disclosed. The airbag includes a seam having a first seam section and a second seam section, which is formed after the first seam section is formed. The second seam section has an extremity and an overlapped portion, which is a section between the extremity and an intersected portion. The first seam section has an end part, which includes an overlapping portion. The overlapping portion is located at a position inside of the overlapped portion of the second seam section and extends along the overlapped portion. The overlapping portion includes an intersecting portion, which intersects the intersected portion of the second seam section. The end part of the first seam section further includes an extension, which extends from the intersecting portion to a position that is outside of the second seam section.

6 Claims, 5 Drawing Sheets

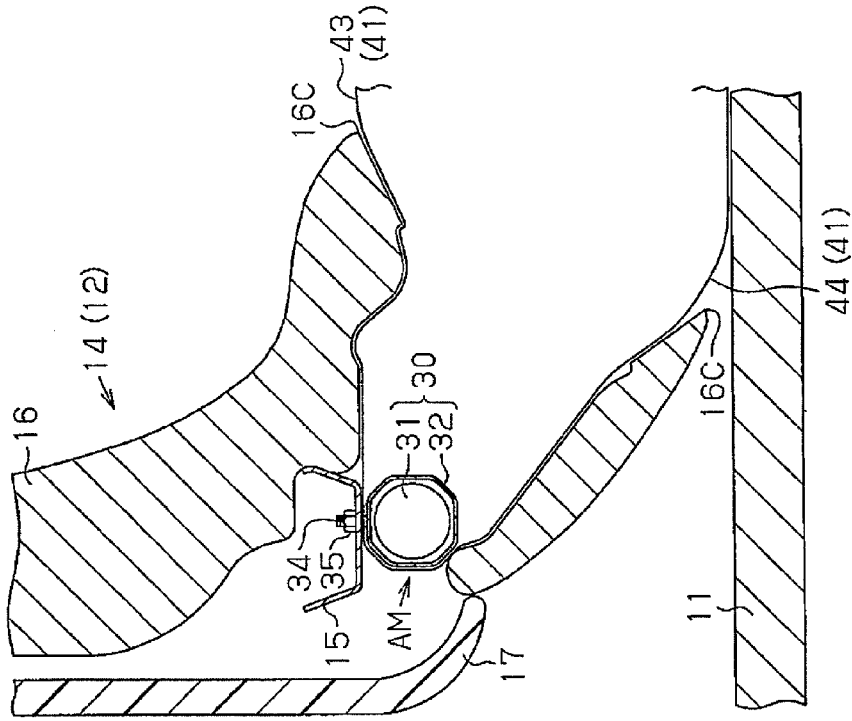
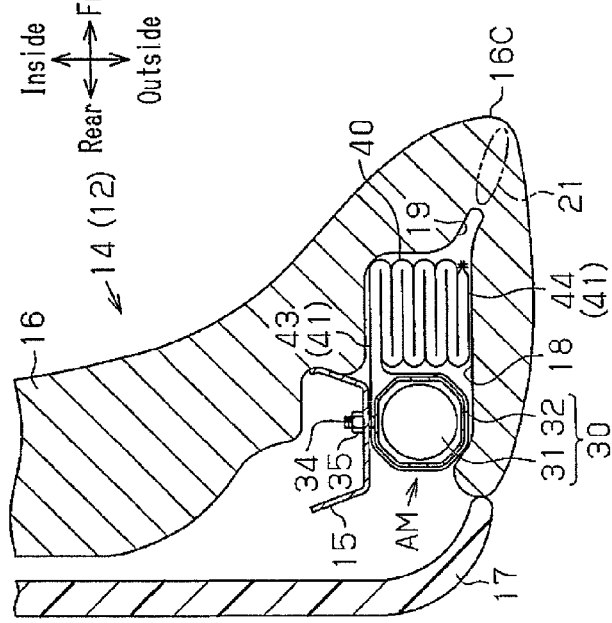

AIRBAG APPARATUS

BACKGROUND OF THE INVENTION

The present invention relates to an airbag apparatus that inflates an airbag to protect an occupant from an impact that is applied to a vehicle such as a car due to a collision or the like.

An air bag apparatus is effective for protecting an occupant when an impact is applied to a vehicle such as a car. For example, an airbag apparatus disclosed in Japanese National Phase Laid-Open Patent Publication No. 2007-530364 has been known. The airbag apparatus includes an airbag 81 and an inflator 82 as shown in FIGS. 7(A) and 7(B).

The airbag 81 is formed by sewing a base fabric 83 to form a bag and includes a seam A and an inflation portion B, which is surrounded by the seam A. The seam A includes seam sections 84, 85, which are adjacent to each other. The seam sections 84, 85 are connected to and intersect each other at an intersecting portion 89. The seam sections 84, 85 have end parts 84A, 85A, respectively. The end parts 84A, 85A are located farther from the center of the inflation portion B than the intersecting portion 89.

The airbag 81 also has an additional seam section 88, which divides the inflation portion B into an upper inflation portion 86 and a lower inflation portion 87. The intersecting portion 89 of the seam sections 84, 85 faces the lower inflation portion 87.

According to the above described airbag apparatus, the inflator 82 supplies inflation gas to the inflation portions 86, 87 when an impact is applied to components of a vehicle, so that the airbag 81 is deployed and inflated. The deployed and inflated airbag 81 is located between an occupant and a vehicle component that bulges into the vehicle to absorb the energy of the impact, so that the occupant is protected.

When the inflation portions 86, 87 are inflated by inflation gas, parts of the seam A that face the inflation portions 86, 87 (that is, the surrounding parts) directly receive the pressure of the inflation gas. Regarding the seam sections 84, 85, parts except for the end parts 84A, 85A (that is, parts outside of the intersecting portion 89) directly receive the pressure of the inflation gas.

In the seam A, the seam section 84 is formed, for example, after the seam section 85 is formed. In this case, when the seam section 84 is formed, a sewing needle may damage the threads of the seam section 85, which has been formed previously, by being pierced into the seam section 85. If the threads of the seam section 85 are damaged in this manner, the strength of the intersecting portion 89 will be reduced. As a result, when the seam A receives the pressure of inflation gas, the seam section 85 may be broken at the intersecting portion 89. Starting from the broken part, other parts of the seam section 85 may start fraying as shown by lines formed by a long dash alternating with two short dashes in FIG. 7(C). Such breakage of the seam section 85 can be a cause of leakage of inflation gas from the inflation portion 87 to the outside.

SUMMARY OF THE INVENTION

Accordingly, it is an objective of the present invention to provide an airbag apparatus that is capable of preventing inflation gas from leaking through the vicinity of a part at which seam sections intersect.

To achieve the foregoing objective and in accordance with one aspect of the present invention, an airbag apparatus having an airbag, which is formed into a bag shape by sewing a base fabric, is provided. The airbag includes a seam, which is formed by the sewing, and an inflation portion, which is surrounded by the seam and has a center. The inflation portion is capable of being inflated by being supplied with inflation gas. The seam includes a first seam section and a second seam section, which are adjacent to each other. The second seam section is formed after the first seam section is formed. The second seam section has an extremity, which is close to the first seam section, and an overlapped portion, which is a section between the extremity and an intersected portion of the second seam section at which the second seam section intersects the first seam section. The first seam section has an end part, which is close to the second seam section and includes an overlapping portion. The overlapping portion of the first seam section is closer to the center of the inflation portion than the overlapped portion of the second seam section. That is, the overlapping portion of the first seam section is located at a position inside of the overlapped portion of the second seam section. The overlapping portion of the first seam section extends along the overlapped portion of the second seam section. The overlapping portion of the first seam section includes an intersecting portion, which intersects the intersected portion of the second seam section. The end part of the first seam section further includes an extension, which extends from the intersecting portion of the first seam section to a position that is spaced further from the center of the inflation portion than the second seam section. That is, the extension of the first seam section extends to a position outside of the second seam section.

According to this configuration, when the inflation portion is inflated by inflation gas, a part of the seam that surrounds the inflation portion directly receives the pressure of the inflation gas. In the vicinity of a part at which the first seam section and the second seam section intersect, the overlapping portion of the first seam section faces the inflation portion while being located inside of and extending along the overlapped portion of the second seam section. Thus, the overlapping portion of the first seam section directly receives the pressure of the inflation gas.

The first seam section is formed prior to the second seam section. Thus, when a sewing needle is pierced into the first seam section during formation of the second seam section, threads forming the first seam section may be damaged. If the threads of the first seam section are damaged in this manner, the overlapping portion of the first seam section is broken at the intersecting portion when the first seam section receives the pressure of the inflation gas. Starting from the broken part, fray may form at other locations on the overlapping portion of the first seam section.

However, even if fray forms on the overlapping portion of the first seam section, the overlapped portion of the second seam section, which is located at a position outside of the overlapping portion of the first seam section, does not receive pressure that is as high as the pressure of inflation gas acting on the overlapping portion of the first seam section. Therefore, the overlapped portion of the second seam section is not likely to fray. As a result, the inflation gas is unlikely to leak through the vicinity of a part at which the first seam section and the second seam section intersect.

In the airbag apparatus described above, the overlapped portion of the second seam section preferably has a length that is longer than or equal to 15 mm.

According to this configuration, under a situation that usually occurs, at least a part of the overlapping portion of the first seam section is prevented from fraying even if the overlapping portion of the first seam section is broken at the intersecting portion. This reliably prevents the leakage of inflation gas.

In the airbag apparatus described above, the intersecting portion of the first seam section intersects the intersected portion of the second seam section preferably while being in a curved state. Also, the extension of the first seam section extends, preferably while being in a curved state, from the intersecting portion of the first seam section to a position that is spaced further from the center of the inflation portion than the second seam section.

According to this configuration, the overlapping portion and the extension of the first seam section are both curved to gradually change the directions in the vicinity of the intersecting portion. This facilitates the sewing of the base fabric to form the first seam section.

In the airbag apparatus described above, the first seam section preferably includes an auxiliary extension, which extends from, as a starting point, the extension. The auxiliary extension extends toward the extremity of the second seam section and along the overlapped portion of the second seam section, so that the overlapped portion of the second seam section is located between the overlapping portion and the auxiliary extension of the first seam section.

As described above, even if fray forms on the overlapping portion of the first seam section, the overlapped portion of the second seam section, which is located at a position outside of the overlapping portion of the first seam section, does not receive pressure that is as high as the pressure of inflation gas acting on the overlapping portion of the first seam section. The auxiliary extension of the first seam section is located at a position outside of the overlapped portion of the second seam section and is therefore less likely to receive the pressure of inflation gas. Thus, in addition to the overlapped portion of the second seam section, the auxiliary extension of the first seam section is unlikely to fray. This reliably prevents the leakage of inflation gas.

The auxiliary extension has a termination preferably at a position that is spaced further from the intersected portion of the second seam section than the extremity of the second seam section.

According to this configuration, the auxiliary extension of the first seam section is longer than the overlapped portion of the second seam section. Thus, if by any chance the pressure of inflation gas causes parts of the first seam section other than and beyond the overlapping portion to fray, the auxiliary extension can be located at a position outside of the frayed parts. This further reliably prevents the leakage of inflation gas.

In the airbag apparatus described above, the first seam section may be one of two first seam sections of the seam. The two first seam sections are preferably located close to each other and preferably have separate partitions for dividing the inflation portion into at least two portions. The overlapping portion of each first seam section is preferably connected to the partition of the same first seam section.

In a case in which the two first seam sections have a common partition instead of the separate partitions, if breakage occurs in the overlapping portion of the first seam section that faces one of the inflation portions, which are adjacent to each other with the common partition in between, the influence of the breakage may reach the other inflation portion via the partition. Contrastingly, in a case in which the two first seam sections each have a separate partition, breakage that occurs in the overlapping portion of one of the first seam sections is unlikely to influence the overlapping portion of the other first seam section.

Other aspects and advantages of the invention will become apparent from the following description, taken in conjunction with the accompanying drawings, illustrating by way of example the principles of the invention.

BRIEF DESCRIPTION OF THE DRAWINGS

FIG. 4(A) is a partially cross-sectional plan view showing the internal structure of a side portion of the seat back in which the airbag module of the embodiment is installed;

FIG. 4(B) is a partially cross-sectional plan view showing a state in which the airbag shown in FIG. 4(A) has popped out of the car seat to be inflated and deployed with a part being left in the seat back;

DETAILED DESCRIPTION OF THE PREFERRED EMBODIMENTS

A vehicle side airbag apparatus according to one embodiment of the present invention will now be described with reference to FIGS. 1 to 5.

In the following, the direction in which a car advances forward will be referred to as the front (that is, the front of the car), and the reverse direction will be referred to as the rear (that is, the rear of the car). The up-down direction refers to the up-down direction of the car. The middle of the width direction of the car is used as reference in the width direction of the car. A side closer to the middle of the width direction will be referred to as "inner side" of the car, while a side farther from the middle of the width direction will be referred to "outer side" of the car.

Figure 1:
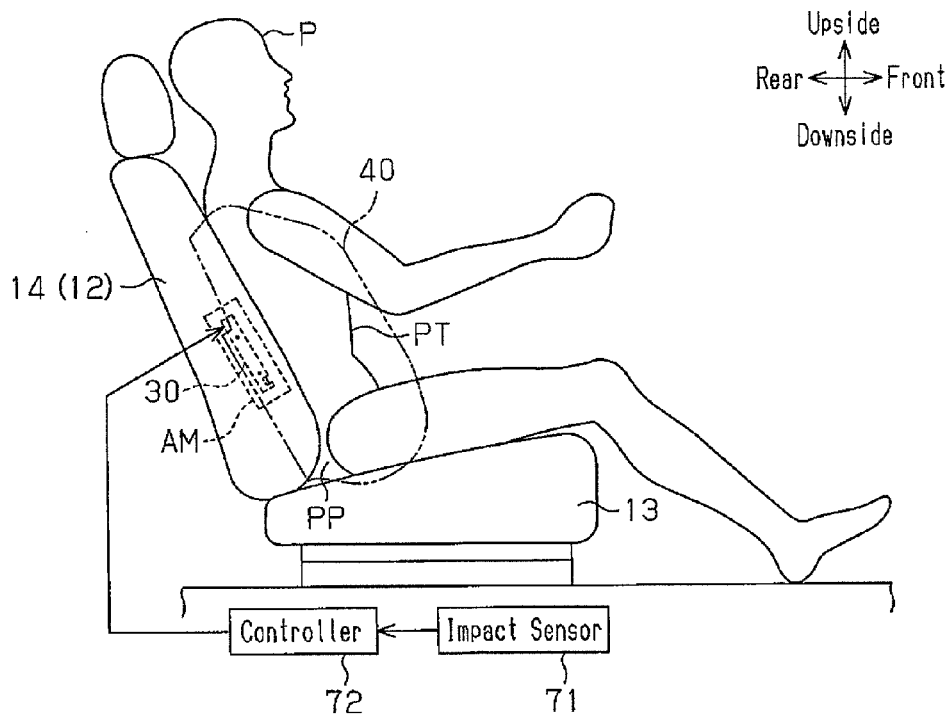
FIG. 1 is a side view of, together with an occupant, a car seat to which a side airbag apparatus according to one embodiment of the present invention is mounted.
Figure 2:
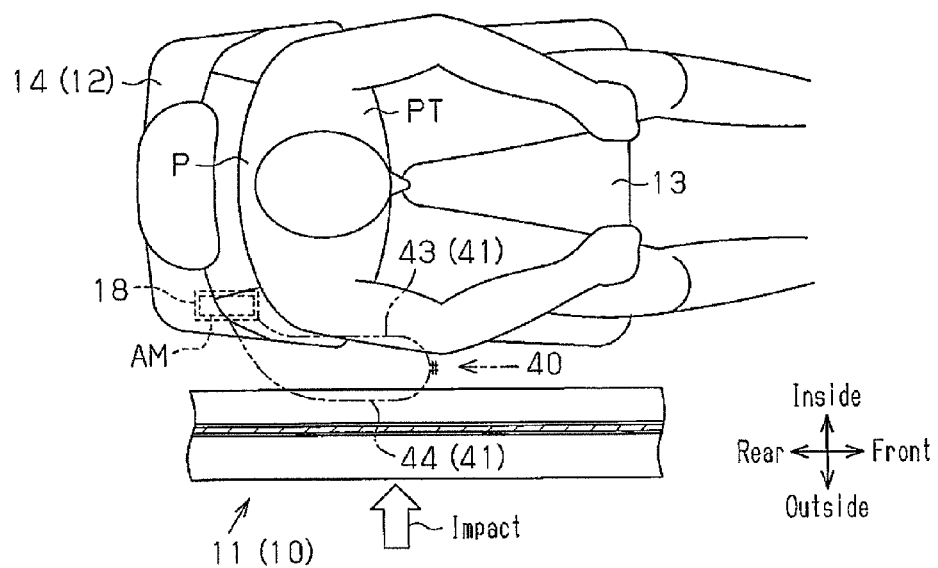
FIG. 2 is a schematic cross-sectional plan view of the positional relationship of the car seat, the occupant, and a body side portion according to the embodiment.

As shown in FIGS. 1 and 2, a car seat 12, which is a vehicle seat, is arranged on the inner side (upper side as viewed in FIG. 2) of a body side portion 11 of a car 10. The body side portion 11 refers to a car component that is located at a side of the car 10 (a vehicle component), and mainly corresponds to a door and a pillar. For example, part of the body side portion 11 that corresponds to the front seat includes a front door and a center pillar (B-pillar). Part of the body side portion 11 that corresponds to the rear seat includes a rear part of the side door (rear door), a C-pillar, a front part of a wheel well, and a rear quarter.

The car seat 12 includes a seat cushion (seat portion) 13 and a seat back (backrest) 14. The seat back 14 extends upward from the rear end of the seat cushion 13, and the inclination angle can be adjusted by a tilt adjusting mechanism (not shown). The car seat 12 is arranged in the car 10 such that the seat back 14 faces forward of the car. The width direction of the thus arranged car seat 12 matches with the width direction of the car.

A seat frame, which forms a framework of the seat back 14, is incorporated in the seat back 14. As shown in FIG. 4(A), a part of the seat frame is located in the outer part of the seat back 14 (a lower part as viewed in FIG. 4(A)). The part of the seat frame (hereinafter referred to as a side frame portion 15) is formed by bending a metal plate. A seat pad 16, which is made of an elastic material such as urethane foam, is provided on the front side of the seat frame, which includes the side frame portion 15. Also, a hard back board 17, which is formed, for example, of plastic, is arranged on the back of the seat frame. Although the seat pad 16 is coated with a cover, the cover is not illustrated in FIG. 4(A). The same applies to FIG. 4(B), which will be discussed below.

In the seat pad 16, a storage portion 18 is provided in the vicinity of the outer side of the side frame portion 15. The storage portion 18 is located in the vicinity of and diagonally backward of an occupant P seated on the car seat 12 (see FIG. 2). The storage portion 18 accommodates an airbag module AM, which forms a main part of the side impact airbag apparatus.

A slit 19 is formed to extend from the outer front corner of the storage portion 18. The slit 19 extends diagonally forward and toward the exterior. A part between a front corner 16C of the seat pad 16 and the slit 19 (a part surrounded by a line formed by a long dash alternating with two short dashes in FIG. 4(A)) forms a breakable portion 21, which is designed to be broken by an airbag 40. The airbag 40 will be described below.

The airbag module AM, which is installed in the seat back 14, includes as its main components the airbag 40 and an inflator assembly 30.

Each of the components will now be described. In the present embodiment, the up-down direction and the front-rear direction of the components of the airbag module AM are defined with reference to the seat back 14 of the car seat 12 as shown in FIG. 1. The direction in which the seat back 14 extends upward is defined as the up-down direction of the airbag module AM and the like, and the thickness direction of the seat back 14 is defined as the front-rear direction of the airbag module AM and the like. As described above, the seat back 14 is slightly inclined backward in normal use. Thus, the up-down direction of the airbag module AM and the like does not strictly match the up-down direction of the car (vertical direction), but is slightly inclined. Likewise, the front-rear direction of the airbag module AM and the like does not strictly match the front-rear direction of the car (the horizontal direction), but is slightly inclined.

<Inflator Assembly 50>

Figure 3:
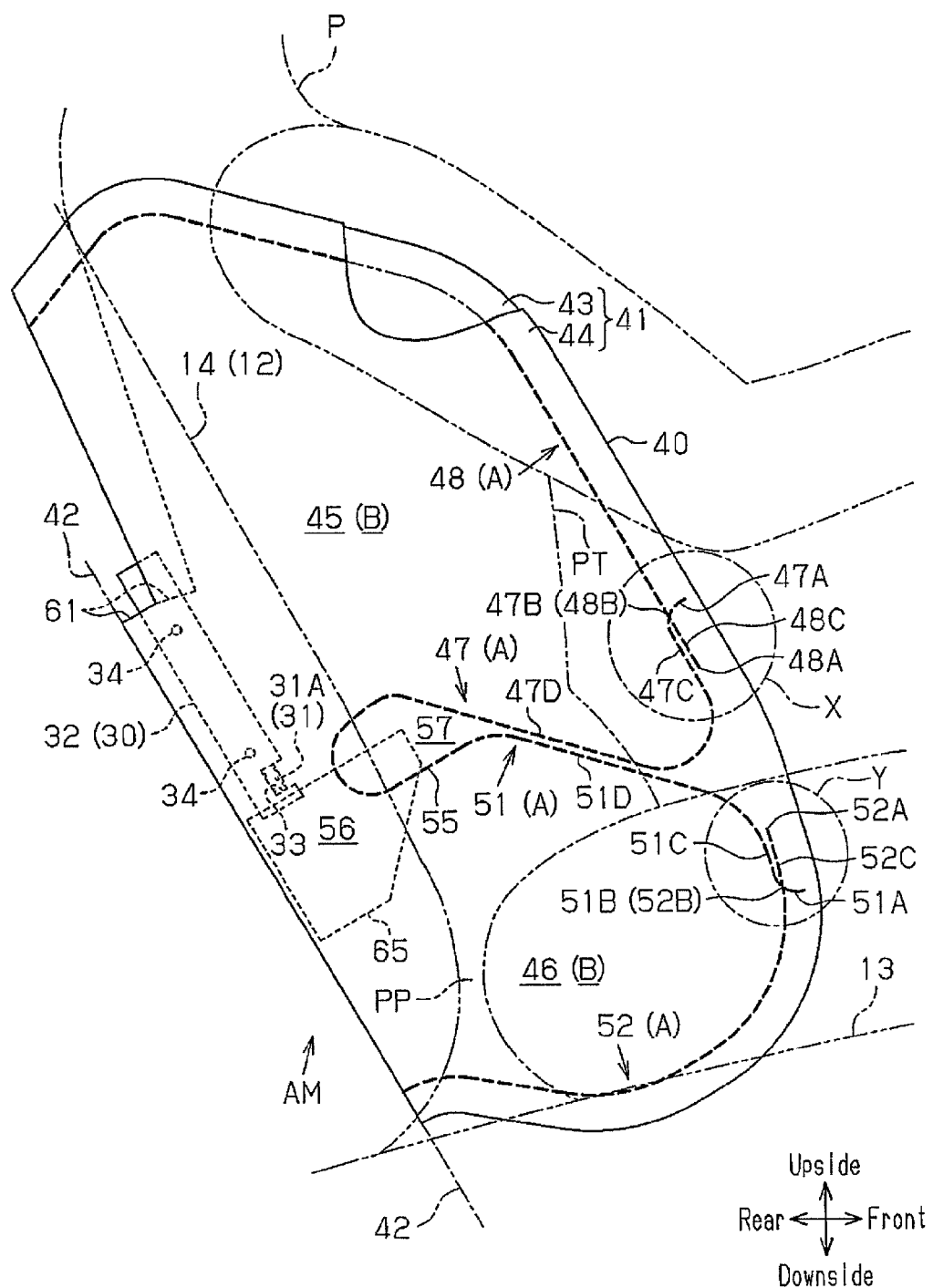
FIG. 3 is a schematic side view of the airbag module according to the embodiment together with the car seat and the occupant, illustrating a state in which the airbag is deployed without being supplied with inflation gas (uninflated and deployed state)

As shown in FIGS. 3 and 4(A), the inflator assembly 30 includes a gas source, which is an inflator 31, and a retainer 32 mounted on the outer surface of the inflator 31. In the present embodiment, a pyrotechnic type inflator is employed as the inflator 31. The inflator 31 is substantially columnar and accommodates a gas generating agent (not shown), which generates inflation gas. A gas outlet 31A, which discharges inflation gas in a radially outward direction of the inflator 31, is provided on one end of the inflator 31 in the longitudinal direction (the lower end in the present embodiment). A harness (not shown), which is wiring for sending activating signals to the inflator 31, is connected to the other end of the inflator 31 in the longitudinal direction (the upper end in the present embodiment).

In place of the pyrotechnic type inflator using the gas generating agent, it is possible to use a hybrid type inflator, which jets out inflation gas by breaking a partition wall of a high-pressure gas cylinder filled with high-pressure gas with a low explosive.

The retainer 32 functions as a diffuser for controlling the direction of discharged inflation gas and also serves as a member for fastening the inflator 31, together with the airbag 40, to the side frame portion 15. Most of the retainer 32 is formed by bending a plate such as a metal plate into a cylindrical shape. The retainer 32 has a window 33 (refer to FIG. 3), through which a considerable amount of the inflation gas discharged by the gas outlet 31A is delivered to the exterior of the retainer 32.

Bolts 34 are fixed to the retainer 32. The bolts 34 serve as securing members for attaching the retainer 32 to the side frame portion 15. In other words, the bolts 34 are indirectly fixed to the inflator 31 by means of the retainer 32.

The inflator 31 and the retainer 32 of the inflator assembly 30 may be integrated.

<Airbag 40>

As shown in FIGS. 1 and 2, when an impact is applied to the body side portion 11 of the car 10 due to a side collision or the like when the car 10 is moving, the inflator 31 supplies inflation gas to the airbag 40. When supplied with the inflation gas, the airbag 40 pops out substantially forward with a part thereof (rear portion) remaining in the storage portion 18, and is deployed and inflated between the occupant P seated on the car seat 12 and the body side portion 11. In this manner, the upper body of the occupant P is protected from the impact of the side collision.

FIG. 3 schematically shows the airbag module AM in a state in which the airbag 40 is deployed without being filled with inflation gas (hereinafter referred to as an uninflated and deployed state). As shown in FIG. 3, a base fabric (also referred to as a fabric panel) 41 is folded into half at a folding line 42, which is located at the middle of the base fabric 41, to overlap onto itself in the car width direction, such that the folding line 42 is located at the rear. The overlapped parts are joined together to form the bag-like airbag 40.

To distinguish the two overlapped parts of the airbag 40, a part located closer to the occupant P when inflated (the one located on the inner side) will be referred to as an inner fabric portion 43. A portion that is located on the opposite side of the inner fabric portion 43 from the occupant P (the one located on the outer side) will be referred to as an outer fabric portion 44. In the base fabric 41, the outer shapes of the inner fabric portion 43 and the outer fabric portion 44 are symmetric with respect to the folding line 42.

In FIG. 3, part of the outer fabric portion 44 is illustrated in a cut away state to show the inner fabric portion 43.

The base fabric 41 is preferably formed of a material having high strength and flexibility to be easily folded. The material may be, for example, woven cloth formed of polyester threads or polyamide threads. The shapes and sizes of the inner fabric portion 43 and the outer fabric portion 44 are set such that when the airbag 40 is deployed and inflated between the car seat 12 and the body side portion 11, the airbag 40 occupies the zone that corresponds to the lumbar region PP, the thorax PT and the like between the occupant P seated on the car seat 12 and the body side portion 11.

The joint of the inner fabric portion 43 and the outer fabric portion 44 is achieved by the seam A, which is formed by sewing with threads. In FIG. 3, the seam A is indicated by thick broken line in a region in which the outer fabric portion 44 is not cut away, and the seam A is indicated by a line formed by a long dash alternating with two short dashes in a region in which the outer fabric portion 44 is cut away to show the inner fabric portion 43.

Between the inner fabric portion 43 and the outer fabric portion 44, a part surrounded by the seam A is the inflation portion B, which is inflated by inflation gas. In the present embodiment, the inflation portion B is formed by a thorax protecting portion 45 and a lumbar region protecting portion 46, which are adjacent to each other in the up-down direction. The thorax protecting portion 45 is formed by an upper portion of the airbag 40 to protect the thorax PT of the occupant P (an adult), who has a medium-sized build and seated in a normal posture. The lumbar region protecting portion 46 is formed by a lower portion of the airbag 40 to protect the lumbar region PP of the occupant P (an adult), who has a medium-sized build and seated in a normal posture.

A part of the base fabric 41 that is closer to the center of the inflation portion B (the thorax protecting portion 45, the lumbar region protecting portion 46) will be referred to as "inner side", and a part that is separated away from the center of the inflation portion B will be referred to as "outer side". In other words, the airbag 40 includes an inner portion, which is a part of the base fabric 41 that includes the center of the inflation portion B and a part surrounding the center, and an outer portion, which is a part of the base fabric 41 that is separated away from the center of the inflation portion B.

Figure 5A:
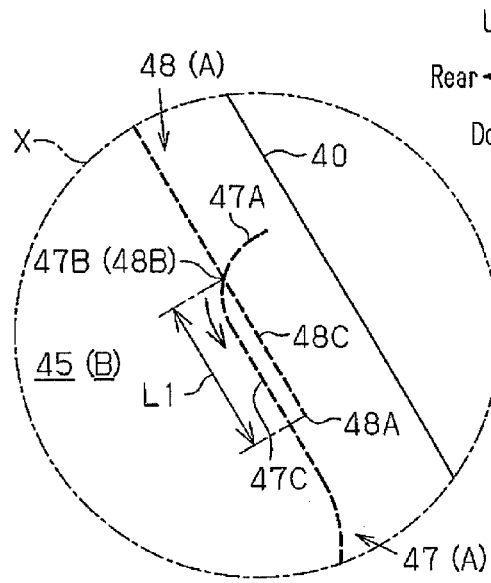
FIG. 5(A) is an enlarged partial side view illustrating section X in FIG. 3.

As shown in FIGS. 3 and 5(A), the seam A of the thorax protecting portion 45 includes a first seam section 47 and a second seam section 48, which is formed above the first seam section 47 after the first seam section 47 is formed. The first seam section 47 and the second seam section 48 intersect and are connected to each other at the intersection.

The second seam section 48 is located at a position separated inward by a certain distance from the periphery of the inner fabric portion 43 and the outer fabric portion 44, and extends along the periphery. A part of the second seam section 48 that is separated diagonally rearward and upward from an extremity 48A (the lower end) close to the first seam section 47 by a length L1 will be referred to as an intersected portion 48B. An end part (a lower part) of the second seam section 48 that is closer to the first seam section 47, or a section between the lower extremity 48A of the second seam section 48 and intersected portion 48B is a linear overlapped portion 48C. The length L1 of the overlapped portion 48C is required to be longer than or equal to 15 mm so that the overlapped portion 48C is located outside of an overlapping portion 47C, which will be discussed below. To ensure the configuration, the length L1 is preferably longer than or equal to 30 mm. In the present embodiment, the length L1 is set to 30 mm.

The first seam section 47 has an extension 47A and the overlapping portion 47C at an upper end part, which is close to the second seam section 48. The overlapping portion 47C is closer to the center of the inflation portion B than the overlapped portion 48C of the second seam section 48. That is, the overlapping portion 47C is located on the inner side of and extends along the overlapped portion 48C. Most of the overlapping portion 47C is parallel with (is separated by a constant distance from) the overlapped portion 48C, and overlaps the overlapped portion 48C in the longitudinal direction of the overlapped portion 48C. An upper portion of the overlapping portion 47C is curved to bulge diagonally rearward and upward and has an intersecting portion 47B, which intersects the intersected portion 48B of the second seam section 48.

The extension 47A is curved to bulge diagonally rearward and upward from the intersecting portion 47B, and is extended to a position further from the center of the inflation portion B than the second seam section 48. That is, the extension 47A is located on the outer side (forward) of the second seam section 48. In the present embodiment, the extension 47A does not reach the periphery of the inner fabric portion 43 and the outer fabric portion 44, but may reach the periphery.

The first seam section 47 has a partition 47D, which is located rearward of the overlapping portion 47C. Except for a front portion, the partition 47D extends in an inclined state such that the partition 47D is lowered toward the front end. The front portion of the partition 47D is curved to bulge forward and downward. The upper end part of the curved portion is connected to the overlapping portion 47C.

Figure 5B:
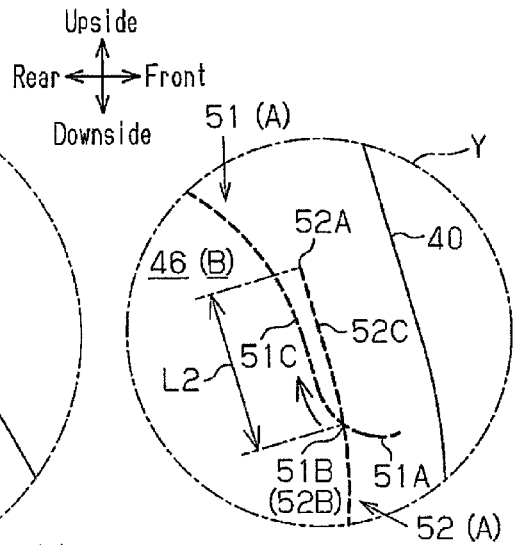
FIG. 5(B) is an enlarged partial side view illustrating section Y in FIG. 3.

As shown in FIGS. 3 and 5(B), the seam A of the lumbar region protecting portion 46 includes a first seam section 51 and a second seam section 52, which is formed below the first seam section 51 after the first seam section 51 is formed. The first seam section 51 and the second seam section 52 intersect and are connected to each other at the intersection.

The second seam section 52 is located at a position separated inward by a certain distance from the periphery of the inner fabric portion 43 and the outer fabric portion 44, and extends along the periphery. A part of the second seam section 52 that is separated downward from an extremity 52A (the upper end) close to the first seam section 51 by a length L2 will be referred to as an intersected portion 52B. An end part (an upper part) of the second seam section 52 that is closer to the first seam section 51, or a section between the extremity 52A and the intersected portion 52B is a linear overlapped portion 52C. The length L2 of the overlapped portion 52C is required to be longer than or equal to 15 mm so that the overlapped portion 52C is located outside of an overlapping portion 51C, which will be discussed below. To ensure the configuration, the length L2 is preferably longer than or equal to 30 mm. In the present embodiment, the length L2 is set to 30 mm.

The first seam section 51 has an extension 51A and the overlapping portion 51C at an end part (a lower part), which is close to the second seam section 52. The overlapping portion 51C is located closer to the center of the inflation portion B than the overlapped portion 52C of the second seam section 52. That is, the overlapping portion 51C is located on the inner side of and extends along the overlapped portion 52C. The overlapping portion 51C overlaps the overlapped portion 52C in the longitudinal direction of the overlapped portion 52C. The distance between most of the overlapping portion 51C and the overlapped portion 52C is substantially constant along the length. A lower portion of the overlapping portion 51C is curved to bulge diagonally rearward and downward and has an intersecting portion 51B, which intersects the intersected portion 52B of the second seam section 52.

The extension 51A is curved to bulge diagonally rearward and downward from the intersecting portion 51B, and is extended further outward (forward) than the second seam section 52. In the present embodiment, the extension 51A does not reach the periphery of the inner fabric portion 43 and the outer fabric portion 44, but may reach the periphery.

The first seam section 51 has a partition 51D, which is located rearward of the overlapping portion 51C. Except for a front portion, the partition 51D is located close to the partition 47D and extends in an inclined state such that the partition 51D is lowered toward the front end. The partitions 47D and 51D are parallel with each other. The partition 47D, 51D divide the inflation portion B into the thorax protecting portion 45 and the lumbar region protecting portion 46. The front portion of the partition 51D is curved to bulge forward. The lower end part of the curved portion is connected to the overlapping portion 51C.

As shown in FIG. 3, the rear ends of the partition 47D, 51D are connected to a coupling portion 55, which is located at a position separated forward from the folding line 42 (the inflator assembly 30). Accordingly, a communication portion 56 is formed in a rear portion of the airbag 40 (between the folding line 42 and the coupling portion 55) to connect the thorax protecting portion 45 and the lumbar region protecting portion 46 to each other.

In the inner fabric portion 43 and the outer fabric portion 44, a part surrounded by the partition 47D, 51D and the coupling portion 55 is a non-inflation portion 57, which is neither supplied with inflation gas nor inflated.

Since the first seam sections 47, 51 have more complicated shapes than the second seam sections 48, 52, it is difficult for a worker to operate a sewing machine to accurately form the first seam section 47, 51. The first seam sections 47, 51 are therefore formed with a programmable electronic sewing machine. The programmable electronic sewing machine automatically controls operation of a cloth feeding mechanism and a sewing needle drive mechanism according to a sewing program that is required for sewing and has been made in advance based on various conditions for determining a sewing path from a sewing starting point to a sewing finish point.

In contrast, the second seam sections 48, 52, which have simpler shapes than the first seam sections 47, 51, are formed with a sewing machine operated by a worker. This is because, although capable of performing accurate sewing, a programmable electronic sewing machine takes relatively longer time to perform sewing, and sewing performed with a sewing machine operated by a worker can be completed in a relatively short time.

The airbag 40 may be formed by stacking two independent base fabrics 41 in the car width direction. In this case, the inside base fabric 41 and the outside base fabric 41 are defined an inner fabric portion 43 and an outer fabric portion 44, respectively, and are sewn together to form a bag. Also, a reinforcing fabric sheet may be provided in the airbag 40 to protect the base fabric 41 and the like from the heat and pressure of inflation gas.

Most of the inflator assembly 30 is accommodated in a rear portion of the airbag 40 (the inflation portion B), and the upper portion of the inflator assembly 30 is passed through an inflator insertion port 61 formed in the base fabric 41 and is exposed to the outside of the airbag 40. The bolts 34 of the retainer 32 are passed through the inner fabric portion 43 (refer to FIG. 4(A)). This determines the position of the inflator assembly 30 in relation to the airbag 40, while fastening the inflator assembly 30. In such a fastened state, the gas outlet 31A of the inflator 31 and the window 33 of the retainer 32 are located rearward of the coupling portion 55.

Further, a check valve 65, which restricts flow of inflation gas from the lumbar region protecting portion 46 to the thorax protecting portion 45, is located in a communication portion 56 of the airbag 40. The check valve 65 is formed of woven fabric to have a tubular shape with upper and lower open ends.

The airbag module AM is made into a compact stage form by folding the airbag 40 in an uninflated and deployed state (refer to FIG. 3) into a form illustrated, for example, in FIG. 4(A). The airbag module AM is folded in this manner in order that it can be readily accommodated in the storage portion 18 having a limited size in the seat back 14.

The airbag module AM in the storage form is fixed to the side frame 15 by inserting the bolts 34 of the retainer 32 through the side frame portion 15 and threading the nuts 35 to the bolts 34.

The retainer 32 may be fixed to the car (the side frame portion 15) using members other than the bolts 34 and the nuts 35.

As shown in FIG. 1, the side airbag apparatus includes an impact sensor 71 and a controller 72 in addition to the above described airbag module AM. The impact sensor 71 is configured by, for example, an acceleration sensor, and is provided in the body side portion 11 of the car (see FIG. 2). The impact sensor 71 detects an impact applied to the body side portion 11 from the exterior. The controller 72 controls the operation of the inflator 31 based on a detection signal from the impact sensor 71.

The airbag apparatus of the present embodiment is constructed as described above. Operation of the side airbag apparatus will now be described.

In the side airbag apparatus, when no impact is applied to the body side portion 11, for example, due to a side collision, the controller 72 sends no activation signal to the inflator 31, so that the inflator 31 does not supply inflation gas to the inflation portion B of the airbag 40. The airbag 40 thus remains stored in the storage portion 18 in the storage form with the inflator assembly 30 (see FIG. 4(A)).

In contrast, when the impact sensor 71 detects that an impact of a magnitude greater than or equal to a predetermined value has been applied to the body side portion 11 due to a side collision or the like while the car is running, the controller 72, based on the detection signal, sends an activation signal to the inflator 31 to activate the inflator 31. In response to the activation signal, the gas generating agent in the inflator 31 generates high temperature and pressure inflation gas, which is jetted out through the gas outlet 31A. Some of the jetted gas is supplied to the thorax protecting portion 45 of the airbag 40. A part of the inflation gas the amount of which is greater than the part of the gas supplied to the thorax protecting portion 45 is supplied to the lumbar region protecting portion 46 through the check valve 65 in an open state.

When the inflation gas is supplied as described above, the thorax protecting portion 45 and the lumbar region protecting portion 46 are inflated. The partition that divides the inflation portion B into the inflation portions 45, 46 may be common for the first seam sections 47, 51, and the overlapping portions 47C, 51C of the first seam sections 47, 51 may branch from the common partition. In this case, however, if breakage occurs in one of the overlapping portions 47C, 51C that faces one of the adjacently arranged thorax protecting portion 45 and lumbar region protecting portion 46, the influence of the breakage is likely reach the overlapping portion 51C, 47C that faces the other one of the inflation portions 46, 45 via the common partition.

In this respect, the two first seam sections 47, 51 of the present embodiment have the partitions 47D, 51D, respectively, which are close to each other and extend to divide the inflation portion B into the thorax protecting portion 45 and the lumbar region protecting portion 46. The overlapping portions 47C, 51C of the first seam sections 47, 51 are connected to the partitions 47D, 51D of the same first seam sections 47, 51, respectively. Therefore, if breakage occurs in one of the overlapping portions 47C, 51C that faces one of the adjacently arranged thorax protecting portion 45 and lumbar region protecting portion 46 with the partitions 47D, 51D in between, the influence of the breakage is unlikely to reach the other one of the overlapping portions 51C, 47C, which faces the other one of the inflation portions 46, 45.

Then, the inflation of the thorax protecting portion 45 and the lumbar region protecting portion 46 unfolds the airbag 40. As shown in FIG. 4(B), the airbag 40 pops out forward with the rear portion thereof and the inflator assembly 30 remaining in the storage portion 18. Thereafter, inflation gas is continuously supplied to the airbag 40 so that the airbag 40 is deployed and inflated forward in a space between the body side portion 11 of the car and the occupant P seated on the car seat 12, as illustrated in FIG. 2. The lumbar region protecting portion 46 is deployed and inflated beside the lumbar regions PP, and the thorax protecting portion 45 is deployed and inflated beside the thorax PT. The airbag 40 is thus located between the occupant P and the body side portion 11, which bulges into the passenger compartment. Since a smaller amount of inflation gas is supplied to the thorax protecting portion 45 than the inflation gas supplied to the lumbar region protecting portion 46, the thorax protecting portion 45 is deployed and inflated at a lower internal pressure than the lumbar region protecting portion 46.

When the body side portion 11 bulges into the passenger compartment due to the collision while the thorax protecting portion 45 and the lumbar region protecting portion 46 are inflated, the airbag 40 is pressed against the occupant P in the car width direction, thereby restraining the occupant P. The airbag 40 reduces the impact that is transmitted from the side to the occupant P through the body side portion 11. More specifically, the impact transmitted to the lumbar regions PP is reduced by the lumbar region protecting portion 46, and the impact transmitted to thorax PT is reduced by the thorax protecting portion 45.

As described above, the thorax protecting portion 45 is inflated at a lower internal pressure than the lumbar region protecting portion 46. Since, in the human body, the lumbar region PP generally has a better impact resistance than the thorax PT, the impact applied to the occupant P by the deployed and inflated airbag 40 is caused to be smaller at the thorax PT than at the lumbar region PP.

When the inflator 31 stops supplying inflation gas, the internal pressure difference between the lumbar region protecting portion 46 and the thorax protecting portion 45 closes the check valve 65. Accordingly, the flow passage in the check valve 65 is blocked. This prevents inflation gas that has been jetted out of the inflator 31 and has flowed into the lumbar region protecting portion 46 from flowing (back) to the thorax protecting portion 45 via the check valve 65.

As shown in FIGS. 3 and 5(A), when the thorax protecting portion 45 is inflated by inflation gas, a part of the seam A that surrounds the thorax protecting portion 45 directly receives the pressure of the inflation gas. In the vicinity of the intersecting portion 47B in the first seam section 47 and the second seam section 48, the overlapping portion 47C is located inside of and extends along the overlapped portion 48C to face the thorax protecting portion 45. The overlapping portion 47C then intersects the second seam section 48 at the intersected portion 48B. The overlapping portion 47C thus directly receives the pressure of inflation gas.

In the present embodiment, the first seam section 47 is formed prior to the second seam section 48. Thus, when a sewing needle is pierced into the first seam section 47 during formation of the second seam section 48, threads forming the first seam section 47 may be damaged. If the threads of the first seam section 47 are damaged in this manner, the strength of the intersecting portion 47B of the first seam section 47 will be reduced.

Therefore, when the pressure of inflation gas is applied to the first seam section 47, the overlapping portion 47C is broken at the intersecting portion 47B. Starting from the broken part, other parts of the overlapping portion 47C may start fraying forward and downward at other locations as shown by an arrow in FIG. 5(A).

However, even if the overlapping portion 47C frays as described above, the overlapped portion 48C of the second seam section 48, which is located on the outside of the overlapping portion 47C, does not receive as high pressure of inflation gas as received by the overlapping portion 47C. Therefore, the overlapped portion 48C is not likely to fray. If at least a part of the overlapping portion 47C is maintained without fraying at a position inside of the overlapped portion 48C, the overlapped portion 48C will be located outside of the maintained part and outside of the frayed part. The inflation gas in the thorax protecting portion 45 must flow through the gap between the unfrayed part the overlapping portion 47C and the overlapped portion 48C before flowing out of the thorax protecting portion 45.

The same applies to a case in which the lumbar region protecting portion 46 is inflated by inflation gas. That is, even if a part of the overlapping portion 51C of the first seam section 51 frays rearward and upward as indicated by an arrow in FIG. 5(B), the overlapped portion 52C of the second seam section 52, which is located on the outside of the frayed portion, is unlikely to fray. Therefore, the inflation gas in the lumbar region protecting portion 46 must flow through the gap between the unfrayed part the overlapping portion 51C and the overlapped portion 52C before flowing out of the lumbar region protecting portion 46.

Through experimentation, it was discovered that when the lengths L1, L2 of the overlapped portion 48C, 52C were 15 mm or longer, at least a part of the overlapping portions 47C, 51C was prevented from fraying even if the intersecting portions 47B, 51B with the second seam sections 48, 52 were broken.

Therefore, according to the present embodiment, in which the lengths L1, L2 are both set to be longer than or equal to 15 mm (specifically, 30 mm), the overlapped portions 48C, 52C will be located at parts outside of the frayed part and outside of the unfrayed part in the overlapping portions 47C, 51C. The inflation gas in the thorax protecting portion 45 and the lumbar region protecting portion 46 must flow through the gap between the unfrayed part of the overlapping portions 47C, 51C and the overlapped portion 48C, 52C before flowing out of the thorax protecting portion 45 and the lumbar region protecting portion 46.

The present embodiment described above has the following advantages.

(1) The overlapped portions 48C, 52C of the second seam sections 48, 52 are prevented from fraying even if the first seam sections 47, 51 directly receive the pressure of inflation gas, and then the overlapping portions 47C, 51C are broken at the intersecting portions 47B, 51B with the second seam sections 48, 52, and fray starts from the broken parts. As a result, the inflation gas in the thorax protecting portion 45 and the lumbar region protecting portion 46 is prevented from leaking through parts in the vicinity of the intersecting portions 47B, 51B.

If the extensions 47A, 51A extend from the intersecting portions 47B, 51B to positions inside of the second seam sections 48, 52, that is, if the extensions 47A, 51A extend into the thorax protecting portion 45 and the lumbar region protecting portion 46 to sew the inner fabric portion 43 and the outer fabric portion 44 to each other, the thickness of the inflation portions 45, 46 when inflated will be reduced. This lowers the impact absorbing performance of the inflation portions 45, 46.

However, according to the present embodiment, the extensions 47A, 51A extend from the intersecting portions 47B, 51B to positions outside of the second seam sections 48, 52. The extensions 47A, 51A sew the inner fabric portion 43 and the outer fabric portion 44 to each other at positions outside of the inflation portions 45, 46. Thus, the thickness of the inflation portions 45, 46 when inflated is not reduced by the extensions 47A, 51A, and the impact absorbing performance is not lowered.

(2) The lengths L1, L2 of the overlapped portions 48C, 52C of the second seam sections 48, 52 are both set to be 15 mm or longer.

Therefore, under a situation that usually occurs, even if the overlapping portions 47C, 51C are cut and fray at the intersecting portions 47B, 51B with the second seam sections 48, 52, at least a part of the overlapping portions 47C, 51C is prevented from fraying. The advantage of the above item (1) can therefore be achieved.

(3) The overlapping portions 47C, 51C of the first seam sections 47, 51 are caused to intersect the second seam sections 48, 52 at the intersecting portions 47B, 51B while being curved. Also, the extensions 47A, 51A extend to positions outside of the second seam sections 48, 52, while being curved relative to the intersecting portion 47B, 51B.

In this manner, the first seam sections 47, 51 gradually change the directions by being curved in the vicinity of the intersecting portions 47B, 51B both in the overlapping portion 47C, 51C and in the extension 47A, 51A. This facilitates the sewing of the base fabric 41 to form the first seam sections 47, 51.

(4) The seam A includes the two first seam sections 47, 51, which have the partitions 47D, 51D, respectively. The partitions 47D, 51D extend in a closely arranged state to divide the inflation portion B into the thorax protecting portion 45 and the lumbar region protecting portion 46. The overlapping portions 47C, 51C of the first seam sections 47, 51 are connected to the partitions 47D, 51D of the same first seam sections 47, 51, respectively.

Therefore, if breakage occurs in one of the overlapping portions 47C, 51C that faces one of the adjacently arranged thorax protecting portion 45 and lumbar region protecting portion 46 with the partitions 47D, 51D in between, the influence of the breakage is prevented from reaching the other one of the overlapping portions 51C, 47C, which faces the other one of the inflation portions 46, 45.

The above embodiment may be modified as follows.

<Regarding the First Seam Sections 47, 51>

Figure 6A:
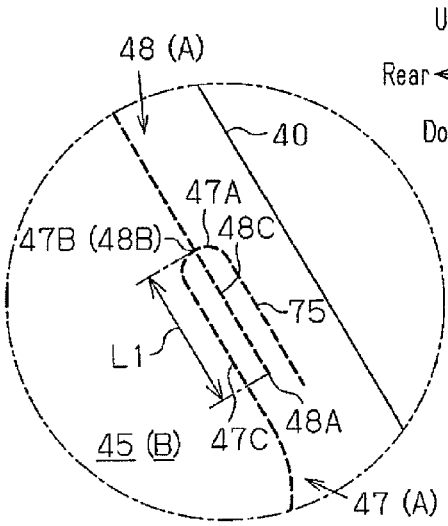
FIGS. 6(A) and 6(B) are partially side views showing modifications of a part at which the first seam section and the second seam section intersect.

As shown in FIG. 6(A), the first seam section 47, which faces the thorax protecting portion 45, may further include an auxiliary extension 75, which extends from the extension 47A as a starting point. The auxiliary extension 75 extends (forward and downward) toward the extremity 48A of the second seam section 48 and along the overlapped portion 48C, so that the overlapped portion 48C of the second seam section 48 is located between the overlapping portion 47C and the auxiliary extension 75.

According to this configuration, even if the overlapping portion 47C frays, the overlapped portion 48C, which is located on the outside of the overlapping portion 47C, does not receive as high pressure of inflation gas as received by the overlapping portion 47C. In addition, the auxiliary extension 75 is located outside of the overlapped portion 48C and is therefore less likely to receive the pressure of inflation gas. Thus, in addition to the overlapped portion 48C, the auxiliary extension 75 is unlikely to fray. As a result, the inflation gas in the thorax protecting portion 45 is unlikely to leak through part in the vicinity of the intersecting portion 47B.

Further, the auxiliary extension 75 may have a termination located at a position spaced further from the intersected portion 48B than the extremity 48A of the second seam section 48 (at a front lower position). That is, the auxiliary extension 75 may be formed to be longer than the overlapped portion 48C to extend away from the intersected portion 48B.

According to this modification, if by any chance the pressure of inflation gas causes parts of the first seam section 47 other than and beyond the overlapping portion 47C to fray, the auxiliary extension 75 can be located on the outside of the frayed parts. This further reliably prevents the leakage of inflation gas.

The above modification is not limited to the thorax protecting portion 45, but may also be applied to the first seam section 51, which faces the lumbar region protecting portion 46.

Figure 6B:
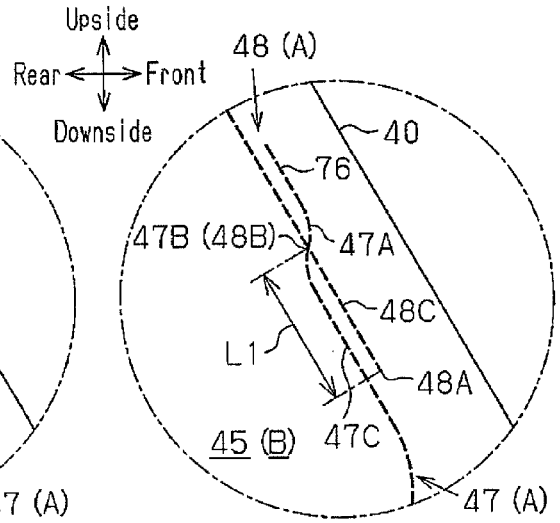
Figure 7A:
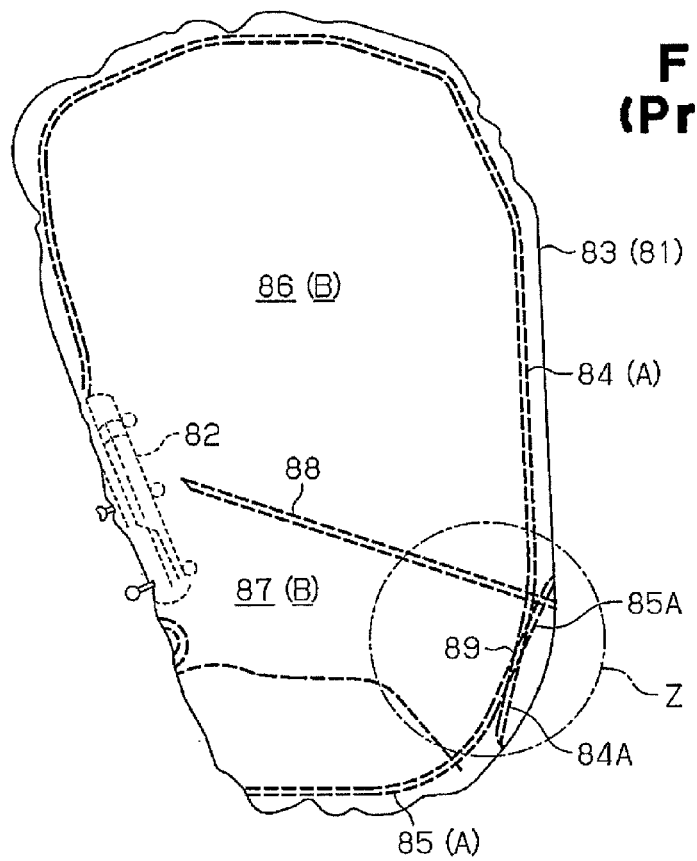
FIG. 7(A) is a side view schematically showing the structure of a prior art airbag apparatus.
Figure 7B:
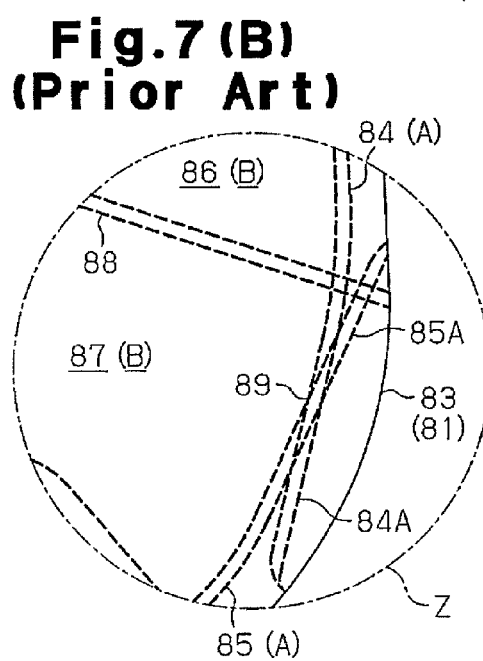
FIG. 7(B) is an enlarged partial side view illustrating section Z in FIG. 7(A)
Figure 7C:
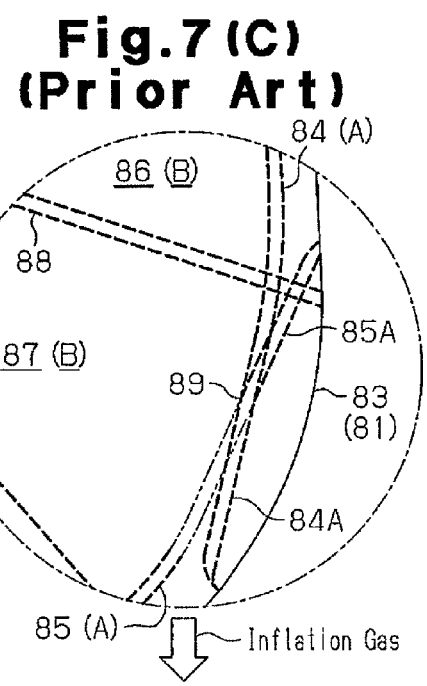
FIG. 7(C) is an enlarged partial side view illustrating a state in which a seam section has frayed in FIG. 7(B).

As shown in FIG. 6(B), the first seam section 47 of the thorax protecting portion 45 may have an auxiliary extension 76, which extends from the extension 47A and along the second seam section 48 to a position that is opposite from the extremity 48A of the second seam section 48 (diagonally rearward and upward).

In this case also, the upper end part of the overlapping portion 47C is curved and intersects the second seam section 48 at the intersecting portion 47B, and the extension 47A extends in a curved state from intersecting portion 47B to a position outside (forward of) the second seam section 48. The directions of the overlapping portion 47C and the extension 47A are gradually changed by reducing the curvature of the curved sections. This facilitates sewing of the base fabric 41 to form the first seam section 47.

The above modification is not limited to the thorax protecting portion 45, but may also be applied to the first seam section 51, which faces the lumbar region protecting portion 46.

The distance between the overlapping portion 47C and the overlapped portion 48C does not have to be constant in the longitudinal direction. That is, the overlapping portion 47C does not necessarily have to be parallel with the overlapped portion 48C. The same applies to the distance between the overlapping portion 51C and the overlapped portion 52C.

The partition 47D, 51D of the first seam sections 47, 51 do not necessarily need to be connected to each other by the coupling portion 55. In this case, the partition 47D, 51D may be connected by intersecting with each other. Also, the partition 47D, 51D may extend while being close to each other without being connected to each other.

<Regarding the Overlapped Portions 48c, 52c>

The lengths L1, L2 of the overlapped portions 48C, 52C may be changed as long as the lengths L1, L2 are 15 mm or longer. In this case, the lengths L1, L2 may be equal to or different from each other.

<Regarding the Seam A>

The seam A may be formed by three or more seam sections. In this case, in an adjacent pair of the seam sections, the one that is formed first is treated as a first seam section, and the one that is formed afterward is treated as a second seam section.

The seam A may be formed, for example, by a single first seam section and two second seam sections, which are connected to the first seam section by intersecting both end parts of the first seam section.

Conversely, the seam A may be formed by a single second seam section and two first seam sections, which are connected to the second seam section by intersecting both end parts of the second seam section.

In a case in which the seam A has two first seam sections, each first seam section may have partitions that extend while being arranged to be close to each other and divide the inflation portion B into three or more sections.

The seam A may be used only to form a bag from the base fabric 41 without dividing the inflation portion B.

<Regarding the Inflator Assembly 30>

The side airbag apparatus may be configured such that the inflator assembly 30 is entirely accommodated in the airbag 40. Conversely, the inflator assembly 30 may be entirely outside of the airbag 40. In the latter case, the inflator 31 and the inflation portion B may be connected to each other by a pipe or the like, so that inflation gas discharged by the inflator 31 is supplied to the inflation portion B via the pipe or the like.

<Regarding the Storage Portion 18>

Instead of the seat back 14 of the car seat 12, the storage portion 18 may be located in the body side portion 11 to accommodate the airbag module AM.

<Other Modification>

The present invention may be applied to an airbag apparatus the airbag of which has one inflation portion or more than two inflation portions.

In the above illustrated embodiment, a side airbag apparatus has been described that mainly protects the lumbar region PP and the thorax PT of the occupant P. However, the present invention may be applied to a side airbag apparatus that protects a part of a side of an occupant P other than the lumbar regions PP and the thorax PT from an impact due to a side collision or the like.

The present invention may be applied to a car seat 12 that faces in a direction other than the forward direction, for example, to a car seat 12 that faces sideways. In this case, when an impact is applied to a side of the car seat 12 (in the front-rear direction of the car), the side airbag apparatus protects an occupant P from the impact.

Other than side airbag apparatuses, the present invention may be applied to any type of airbag apparatus that inflates an airbag at a position close to an occupant to restrain the occupant. In this case, an inflator having a shape other than a cylindrical shape may be used.

Cars to which the airbag apparatus according to the present invention is applied include various industrial vehicles in addition to private automobiles.

The present invention may also be applied to an airbag apparatus installed in the vehicle seats in vehicles other than cars, including aircrafts and ships.

The invention claimed is:

1. An airbag apparatus having an airbag, which is formed into a bag shape by sewing a base fabric, wherein the airbag includes a seam, formed by the sewing, and an inflation portion, surrounded by the seam and has a center, wherein the inflation portion is capable of being inflated by being supplied with inflation gas, and wherein the seam includes a first seam section and a second seam section, which are adjacent to each other, wherein the second seam section is formed after the first seam section is formed, wherein the second seam section has an extremity, close to the first seam section, and an overlapped portion, a section between the extremity and an intersected portion of the second seam section, the second seam section intersects the first seam section, and wherein the first seam section has an end part, close to the second seam section and includes an overlapping portion, closer to the center of the inflation portion than the overlapped portion of the second seam section and extends along the overlapped portion of the second seam section, wherein the overlapping portion of the first seam section includes an intersecting portion, intersecting the intersected portion of the second seam section, and wherein the end part of the first seam section further includes an extension, extending from the intersecting portion of the first seam section to a position that is spaced further from the center of the inflation portion than the second seam section.

2. The airbag apparatus according to claim 1, wherein the overlapped portion of the second seam section has a length that is longer than or equal to 15 mm.

3. The airbag apparatus according to claim 1, wherein the intersecting portion of the first seam section intersects the intersected portion of the second seam section while being in a curved state, and the extension of the first seam section extends, while being in a curved state, from the intersecting portion of the first seam section to a position that is spaced further from the center of the inflation portion than the second seam section.

4. The airbag apparatus according to claim 1, wherein the first seam section further includes an auxiliary extension, which extends from, as a starting point, the extension, and the auxiliary extension extends toward the extremity of the second seam section and along the overlapped portion of the second seam section, so that the overlapped portion of the second seam section is located between the overlapping portion and the auxiliary extension of the first seam section.

5. The airbag apparatus according to claim 4, wherein the auxiliary extension has a termination at a position that is spaced further from the intersected portion of the second seam section than the extremity of the second seam section.

6. The airbag apparatus according to claim 1, wherein the first seam section is one of two first seam sections of the seam, the two first seam sections are located close to each other and have separate partitions for dividing the inflation portion into at least two portions, and the overlapping portion of each first seam section is connected to the partition of the same first seam section.

* * * * *